United States Patent [19]

Legget

[11] Patent Number: 5,121,872
[45] Date of Patent: Jun. 16, 1992

[54] METHOD AND APPARATUS FOR INSTALLING ELECTRICAL LOGGING CABLE INSIDE COILED TUBING

[75] Inventor: Henry H. Legget, Hallsville, Tex.

[73] Assignee: Hydrolex, Inc., Longview, Tex.

[21] Appl. No.: 752,774

[22] Filed: Aug. 30, 1991

[51] Int. Cl.⁵ .............................................. B21D 39/00
[52] U.S. Cl. .................................... 228/148; 228/222; 228/17
[58] Field of Search ................ 228/17, 17.5, 148, 222, 228/231

[56] References Cited

U.S. PATENT DOCUMENTS

| | | | |
|---|---|---|---|
| 2,975,087 | 3/1961 | Donald | 228/148 X |
| 3,085,729 | 4/1963 | Lehnert | 228/17 X |
| 3,486,219 | 12/1969 | Davies | 228/231 X |
| 4,796,798 | 1/1989 | Tsuta et al. | 228/222 X |
| 5,072,870 | 12/1991 | Ziemek | 228/17.5 X |

FOREIGN PATENT DOCUMENTS

| | | | |
|---|---|---|---|
| 0946481 | 4/1974 | Canada | 228/148 |
| 2717558 | 11/1977 | Fed. Rep. of Germany | 228/222 |

Primary Examiner—Richard K. Seidel
Assistant Examiner—Patty E. Hong

[57] ABSTRACT

A method and apparatus for manufacturing a coiled tubing/electrical cable assembly wherein a strip of metal and electrical cable are simultaneously withdrawn from storage reels and are moved through a manufacturing station where the metal strip is formed about the cable and welded to define coiled tubing. The electrical cable is guided into the tubing by a cable placement tube that also serves to conduct coolant such as air, water, etc. along the electrical cable to prevent its temperature degradation during the manufacturing process. The cable placement tube is of sufficient length to extend past the welding apparatus and through a heat treating furnace assembly and to provide an outlet for discharge of the coolant medium into the coiled tubing cable at a location downstream of the heat treating furnace.

17 Claims, 2 Drawing Sheets

METHOD AND APPARATUS FOR INSTALLING ELECTRICAL LOGGING CABLE INSIDE COILED TUBING

FIELD OF THE INVENTION

This invention relates generally to the manufacture of coiled tubing for petroleum wells, and more specifically to a method and apparatus for simultaneously manufacturing coiled tubing from metal strip material and placement of electrical logging cable inside the coiled tubing during such manufacture while at the same time continuously cooling the electrical logging cable to insure against its degradation by the heat of welding and heat treating operations that occur during the manufacture of the coiled tubing.

BACKGROUND OF THE INVENTION

In the petroleum industry at the present time, many different exploration and production operations can be carried out with respect to petroleum producing wells through the use of continuous tubing which is typically referred to as coiled tubing. Coiled tubing for use in wells is typically stored on a large reel and is run into and out of oil and gas wells in much the same way as wireline cable. Coiled tubing has become especially advantageous in the drilling, completion, and production of petroleum producing wells that are drilled in such manner that significant portions of the well bore are substantially deviated from the vertical or translated from the vertical to horizontal or near horizontal so that a well bore of significant length can be located within a very narrow petroleum production zone.

Coiled tubing is also extensively utilized in the positioning and manipulation of hydraulically energized downhole devices that accomplish various operational activities in deep petroleum producing wells. For example, through the use of coiled tubing which can be quickly run into a well, various servicing activities can be conducted such as setting packers and plugs, circulating heavy fluids out and replacing them with lighter fluids or by replacing fluids with a gas such as nitrogen. Coiled tubing also finds efficient use in other well servicing activities such as perforating the well casing, killing the well or producing the well. These operations are typically conducted by applying pump pressure within the internal passage of the coiled tubing to manipulate various downhole devices by means of hydraulic pressure.

More recently it has been determined that various other desirable downhole working operations can be accomplished by installing an electrical logging cable inside the coiled tubing and accomplishing logging functions while carrying out hydraulically energized downhole operations in the manner set forth above. Although the use of coiled tubing with electrical logging cable inside is desirable, installation of logging cable within coiled tubing can be difficult and expensive. It should be born in mind that coiled tubing for a rather deep well can be more than 15,000 feet in length.

In the past, the processes utilized for installation of electrical logging cable within coiled tubing has taken two general forms. One cable installation procedure is accomplished by uncoiling the tubing onto a long deserted or seldom traveled stretch of road and by then pumping the electrical cable into the horizontally oriented coiled tubing by hydraulic pressure using a cup seal attached to the logging cable to provide a locomotive force to the cable. This activity is accomplished by passing the electrical cable through a stuffing box to permit hydraulic pressure build-up within the coiled tubing upstream of the cup seal to develop a pressure differential across the cup seal that develops the motive force for cable insertion. This procedure causes a number of disadvantages. It is difficult to gain access to three to four miles of fairly flat deserted roadway. It is difficult to locate a road that will remain deserted long enough to complete tubing layout, logging cable installation, and recoiling of the tubing. It is also difficult with the coiled tubing lying flat to apply the correct tension to the logging cable as it is installed inside the horizontally located coiled tubing because the cable tends to increase tension or shorten when the tube is spooled up onto a coiled tubing reel. As the logging cable is pumped or forced into the horizontally located coiled tubing by means of hydraulic or pneumatic pressure to the cup seal, the initial portion of the cable is dragged along the inside surface of the coiled tubing. The surface contact that occurs between the logging cable and the coiled tubing tends to erode the electrical insulating material of the coiled tubing especially if the tubing has any internal roughness projections or other irregularities. Obviously, any wear or erosion of the electrical logging cable is undesirable and may be unacceptable.

The other frequently used process for installing electrical logging cable inside coiled tubing is to locate a well deep enough to lower all of the tubing into. This well must of course be abandoned from the standpoint of petroleum production. To accomplish this type of cable installation the coiled tubing is run into the well and appropriately supported at the surface. A cup seal is fixed to the lower end of the electrical logging cable and is pumped down into the vertically suspended coiled tubing in the same manner as discussed above in connection with the horizontal cable installation procedure. In this case, however, the weight of the electrical logging cable is employed to advantage for its installation into the coiled tubing. Also in this case, the electrical logging cable will be worn to some extent by rubbing against the inside surface of the coiled tubing but its wear will typically be substantially less than the wear that occurs during the horizontal logging cable installation procedure. A few abandoned petroleum wells are provided by well owners for installation of logging cable into coiled tubing. These abandoned wells must be maintained and inspected regularly and thus represent a significant expense to the well owners. Obviously, to recover well maintenance expenses and to provide a profit for the well owners, users will incur significantly high costs paid for use of the well for the purpose of logging cable installation. This well use cost of course represents a commercial disadvantage which is overcome by the present invention. Further, for installation of logging cable within coiled tubing, the tubing must be transported to the site of the abandoned well, and after installation of the logging cable, must be again transported to an appropriate site for storage or for use. The expense of such transportation is another commercial disadvantage that is overcome by the present invention.

It is desirable, therefore, to provide a method and apparatus for the manufacture of coiled tubing with electrical logging cable being positioned within the coiled tubing during the manufacturing process. The provision of the coiled tubing in this manner avoids the requirement for sparsely traveled roads or the use of abandoned wells for installation of electrical logging cable inside previously manufactured coiled tubing. It is desirable also to provide a coiled tubing/electrical logging cable assembly wherein the logging cable is protected from erosion or other types of deterioration during the manufacturing process for the assembly.

SUMMARY OF THE INVENTION

According to the teachings of the present invention, coiled tubing for petroleum well installation is manufactured from metal strip material which is roll formed or formed by other types of dies about electrical logging cable so that the coiled tubing will have the electrical logging cable located therein at the completion of the manufacturing process. The metal strip material of the coiled tubing withdrawn from a storage reel and is roll formed to bring the opposed edges together to define a tube having a longitudinal seam. The tube is formed by the dies about a cable placement tube of smaller outer dimension than the internal dimension of the coiled tubing. The cable placement is fixed at the manufacturing station and is oriented with its longitudinal axis substantially aligned with the longitudinal axis of the coiled tubing being formed by the dies. During the manufacturing operation the internal surface of the coiled tubing is maintained in spaced relation with the external surface of the coolant conductor tube so that an annular space exists therebetween. This annular space minimizes heat transfer toward the cable placement tube.

During the manufacturing operation electrical logging cable is withdrawn from a spool or from some other appropriate source and is passed through a stuffing box into the cable placement tube. The CABLE placement tube is of a diameter exceeding that of the external diameter of the electrical logging cable so that an annular space exists between the logging cable and the internal surface of the cable placement tube during the manufacturing process. A coolant medium such as air, water, a mixture of air and water, or any other suitable flowable coolant medium is caused to flow through the annular space between the logging cable and the internal surface of the cable placement tube for the purpose of efficiently removing heat and insuring that the electrical logging cable is maintained at a temperature well below its degradation temperature during the manufacturing process.

As the electrical logging cable is fed or pulled through the cable placement tube the metal strip is moved linearly at substantially the same velocity and is passed through a series of metal rolls which transform the substantially flat metal strip to a tubular form, bringing the opposed edges of the metal strip into engagement or juxtaposition to form a longitudinal seam along the tubing. Any one of a number of suitable welding systems may be employed to form a continuous weld at the longitudinal seam. The welded coiled tubing with the logging cable inside is then passed through a heat treating station where the weld of the coiled tubing is stressed relieved and the tubing is otherwise heat treated to thus render it suitable for use in petroleum producing wells. The cable placement tube is of sufficient length to extend through an elongate work station including the tubing forming rolls, the tubing welding system and the heat treating system. As the coolant medium passes through the cable placement tube, it efficiently transports away a significant portion of the heat that is transferred by radiation from the coiled tubing being welded and heat treated. Because of the annular spacing of the coiled tubing from the cable placement tube, the weld of the longitudinal seam of the coiled tubing is unaffected by the coolant medium. Further, the heat treating operation for the coiled tubing is also unaffected by the coolant flow through the cable placement tube.

The downstream end of the cable placement tube is located downstream of the stress relief furnace for the heat treating operation and simply exhausts the coolant, which is preferably air, into the annular space that exists between the electrical logging cable and the inside surface of the coiled tubing. Especially where a liquid coolant medium is employed, if immediate removal of the coolant is desirable, such as to minimize the weight of the completed coiled tubing/logging cable assembly, a source of vacuum may be applied to the downstream end thereof at the take-up storage reel to continuously extract the coolant. Further, the vacuum source even in the case of air coolant may provide the motive force for achieving a continuous flow of cooling medium, in this case air, through the cable placement tube. Alternatively, and perhaps preferably, a gaseous medium may be injected into the cable placement tube to provide the motive force for continuous flow of the coolant through the cable placement tube to ensure that the electrical cable of the coiled tubing/electrical logging cable assembly will not be subjected to excessive heat during the welding and heat treating operations.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

IN THE DRAWINGS

Figure 1:
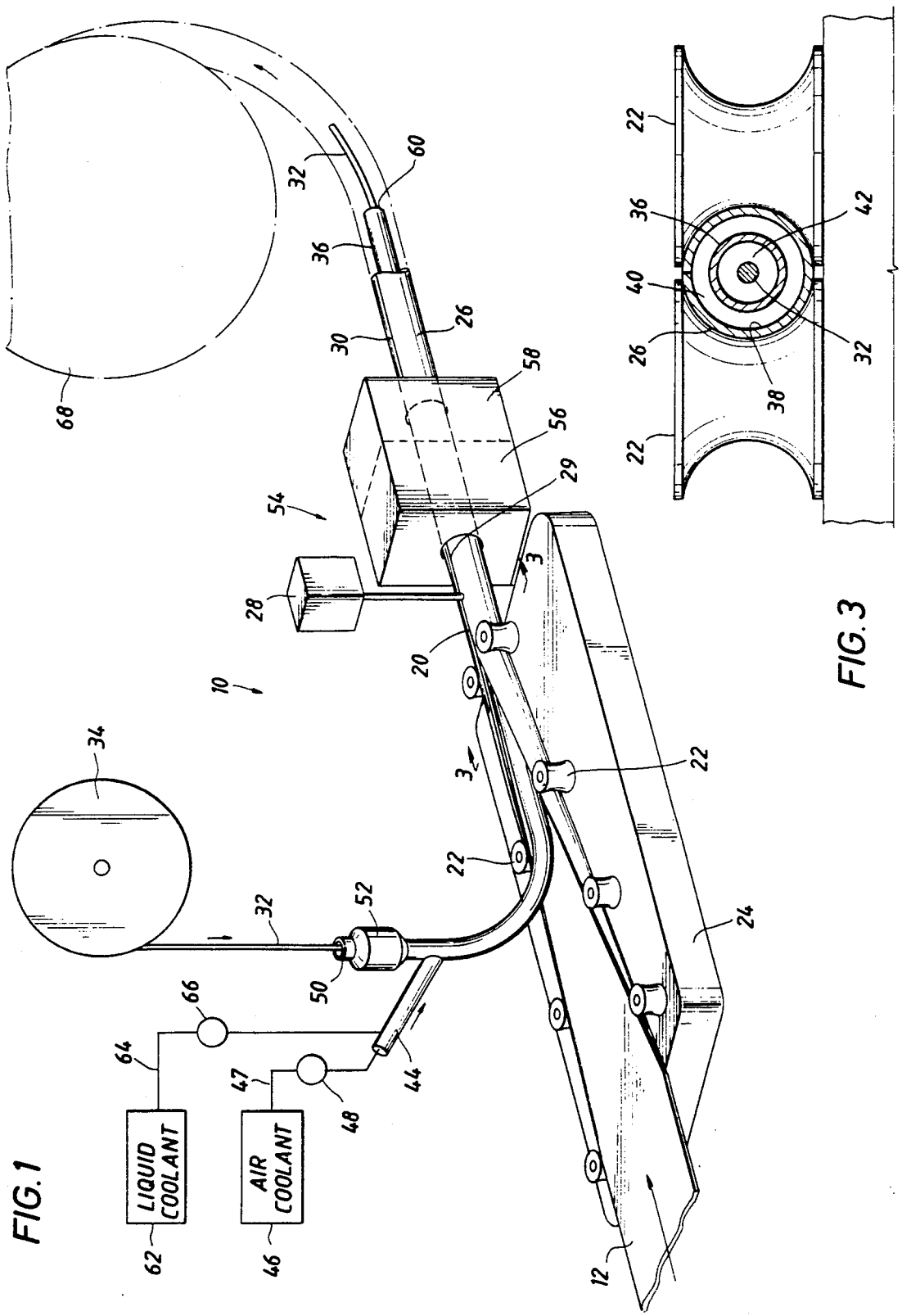

FIG. 1 is an isometric illustration of apparatus for manufacturing coiled tubing/electrical logging cable assembly according to the teachings of the present invention.

Figure 2:
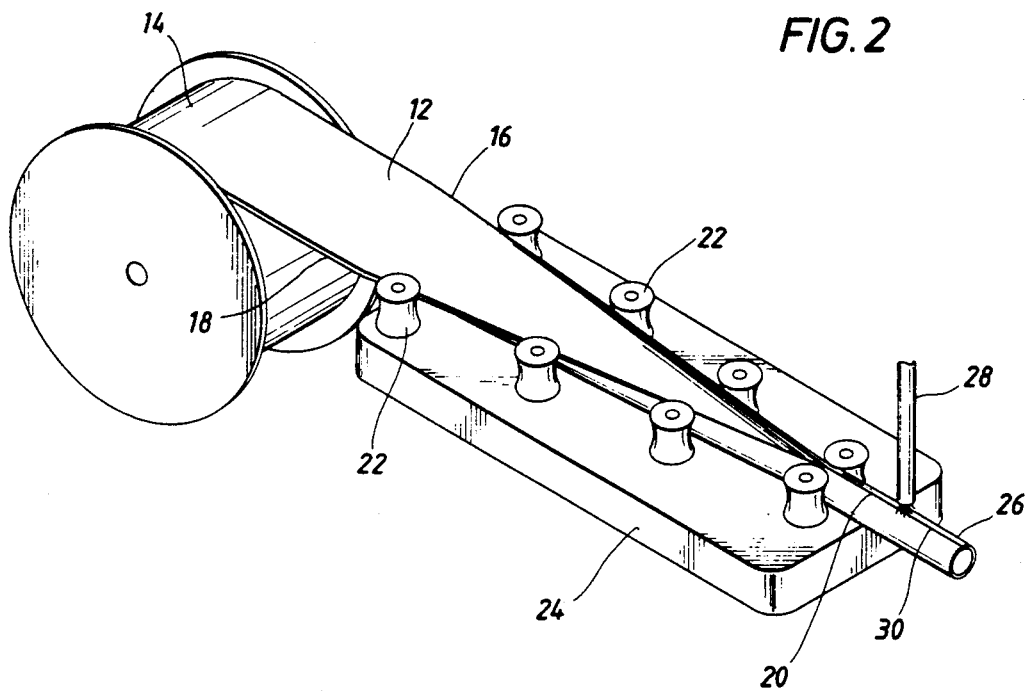

FIG. 2 is an isometric illustration of sheet metal forming dies which are shown to be receiving and forming sheet metal strip stock from a supply roll to form coiled tubing as shown in FIG. 1.

FIG. 3 is a fragmentary sectional view taken along line 3—3 of FIG. 1 and illustrating in section the relative positions of the electrical cable, cable placement and cooling tube and the coiled tubing at the point of coiled tubing seam welding.

Figure 4:
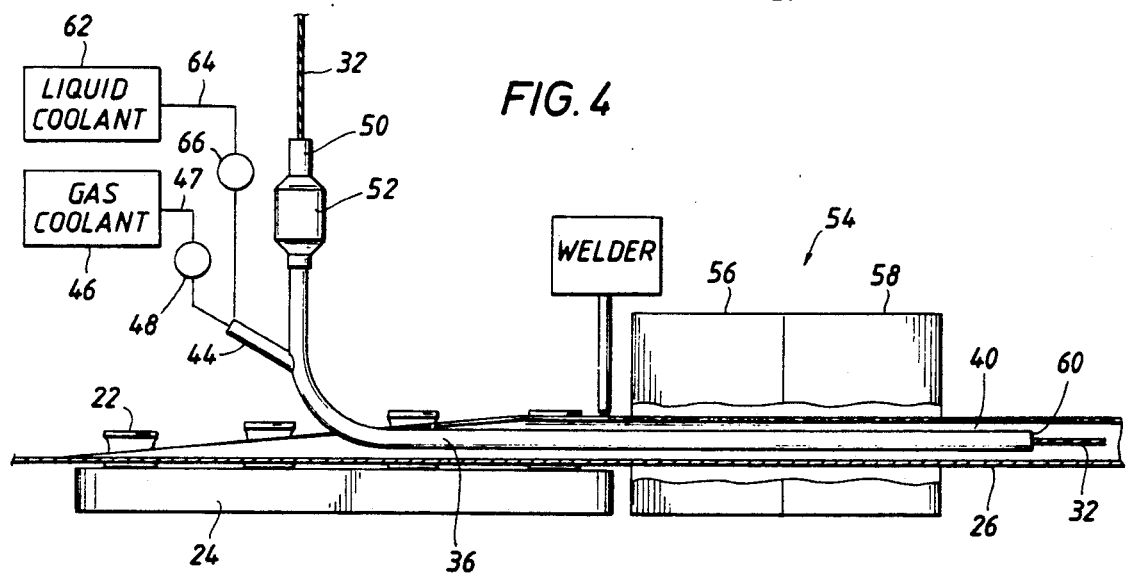

FIG. 4 is an sectional view of the apparatus of FIG. 1 with parts thereof broken away and shown in section.

Figure 5:
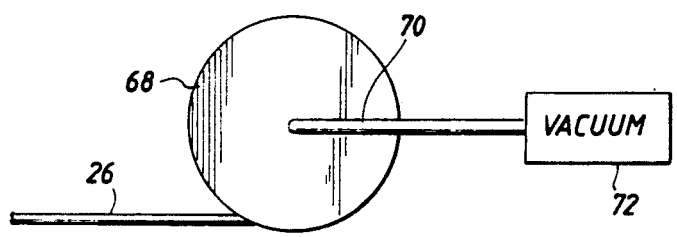

FIG. 5 is an elevational view of a coiled tubing storage reel shown to be provided with a source of vacuum for evacuating the coiled tubing/electrical cable assembly being wound onto the storage reel.

DETAILED DESCRIPTION OF THE PREFERRED EMBODIMENT

Referring now to the drawings and first to FIG. 1, apparatus for the manufacture of a coiled tubing/electrical logging cable assembly is illustrated isometrically and diagrammatically generally at 10. Sheet metal strip stock 12 is withdrawn from a supply roll 14 as shown in FIG. 2. The metal sheet material 12 is then formed from its flat condition to a tubular condition by any suitable tube forming apparatus so as to bring opposed edges 16 and 18 of the metal strip 12 into contact or juxtaposition so as to form a longitudinal seam 20. As shown in FIGS. 1 and 2, the tube forming apparatus comprises a plurality of pairs of roll forming dies 22. The tube forming rolls 22 are supported by any suitable roll form die support structure 24. The pairs of rolls 22 are cooperatively arranged to form the metal strip sheet material 12 from the flat condition emerging from the metal strip supply reel 14 to the tubular form shown at 26. After the seam 20 has been formed by the opposed edges 16 and 18 of the flat sheet strip stock 12, the seam 20 is welded in any suitable fashion by means of an appropriate welding system 28 to form a welded seam 29. Typically, after coiled tubing has been welded in this manner, in order to render it suitable for use in a downhole well environment where it is typically brought into contact with hazardous well constituents such as hydrogen sulfide, salt water, etc., the weld of the tubing must be stressed relieved and the tubing itself must be heat treated. This is accomplished by passing the welded tube through a heat treating furnace system where the tubing is heated sufficiently to stress relieve the weld and to relieve any structural stresses that have been introduced by the localized heat of the welding operation.

According to the teachings of the present invention, it is desirable to locate within the coiled tubing during the manufacturing operation thereof, a continuous length of electrical logging cable such as is shown at 32 in FIG. 1. The logging cable is withdrawn from a storage reel 34 and is positioned with respect to the metal sheet stock 12 and the roll forming dies 22 such that the metal strip stock 12 is formed about the electrical logging cable as the coiled tubing 26 is formed and welded. It is also desirable that the electrical logging cable 30 be maintained during coiled tubing manufacture and stress relief, at a temperature range that is well below the temperature at which the outer insulating material of the electrical logging cable might begin to suffer temperature degradation. Accordingly, the coiled tubing-/electrical logging cable manufacturing system incorporates a cable placement and cooling system that insures that the logging cable is maintained at a sufficiently low temperature that it is not degraded in any manner whatever during the manufacturing operation. According to the teachings of the present invention, a cable placement tube 36 is disposed in substantially fixed relation at the coiled tubing/electrical logging cable manufacturing station and is provided with an elongate, generally straight portion thereof being disposed in axial alignment with the roll forming dies and the metal strip stock 12 such that the coiled tubing is also formed by the rolls 22 about the straight portion of the cable placement tube. The cable placement tube is oriented with respect to the roll forming dies such that it is located centrally of and substantially co-axial with the coiled tubing 26 as the tubing is formed. Thus, as shown in FIG. 3, the cable placement tube 36 is positioned with its outer surface disposed in spaced relation with the inner surface 38 of the coiled tubing 26 to define an annulus 40 therebetween. The annulus 40 is an air space which minimizes transfer of the heat of welding and stress relieving from the coiled tubing 26 to the cable placement tube. Likewise, the electrical logging cable 32 will be positioned in substantially centralized relation within the cable placement tube 26 thereby defining an annulus 42 through which a coolant medium is passed in order to efficiently remove heat that is transferred by radiation or by any other means from the coiled tubing to the cable placement tube. Thus the cable placement tube also functions as a flow passage for the coolant medium.

As shown in FIG. 1, the cable placement tube 36 is provided with a coolant inlet section 44 which is disposed in communication with a source of coolant 46 which is conducted under pressure into the cable placement tube under the control of a valve 48 or any other suitable flow controlling device. The cable placement tube 36 is also provided with a branch tube 50 having a stuffing box 52 therein through which the electrical logging cable 32 passes as it enters the cable placement tube. The stuffing box 52 provides a pressure tight seal with the electrical logging cable and thus prevents escape of fluid pressure from the cable placement tube through the entry opening for the electrical logging cable. Thus, coolant injected into the coolant inlet section or branch 44 is caused to flow in the direction of the flow arrow so that the coolant flows through the annulus 42 and thus efficiently removes heat from about the electrical logging cable in the manner shown in FIG. 3.

The tubing seam welder 28 may take any suitable form that is appropriate for manufacturing coiled tubing. For example, the welding system 28 may be an arc welder, an ultrasonic welder, a laser welder, or any one of a number of acceptable types of welders. The seam at the joint 20 of the coiled tubing 26 may be joined by any other suitable means such as braising for example, so long as the resulting tubing is suitable for use in the downhole environment of petroleum producing wells.

Immediately downstream of the welding station at which the seam is closed by welding or any other suitable means, is located a heat treating furnace system shown generally at 54 and which may incorporate a first stress relief furnace or furnace section 56 for localized heating of the tubing at the weld for the purpose of stress relieving the weld of the longitudinal seam. The heat treating furnace system may also incorporate a second furnace section 58 that is operative to induce general heating to the coiled tubing 26 so as to accomplish stress relief of the tubing itself and to otherwise prepare the metal material for the service conditions of the well within which it is to be located. The elongate, straight portion of the cable placement tube 36 extends completely through the stress relief furnace system and terminates at a cable outlet and coolant discharge opening 60 that is located a sufficient distance downstream of the furnace system 54 to insure efficient heat removal from about the electrical logging cable. The temperature of the logging cable will always remain well below the temperature at which any heat degradation begins to occur.

As shown in FIGS. 1 and 4, the coolant medium being injected into the cable placement tube 36 may be a gaseous coolant as shown in 46 or a liquid coolant such as shown at 62. The gaseous coolant such as air will be conducted through supply line 47 and branch line 44 into the cable placement tube 36 under the control of any suitable control device such as a valve 48. A liquid coolant supply may be provided as shown at 62 with a conductor 64 supplying liquid to the branch line 44 under the control of a valve 66. In the alternative, as shown in FIG. 5, the completed and heat treated coiled tubing 26 with the electrical conductor 32 disposed therein may be conducted to a take-up or storage reel 68 where it is appropriately wound in readiness for transportation to the site of its intended use. The storage reel system 68 may be provided with a conductor 70 which is in communication with a source of vacuum 72. The conductor 70 is coupled to the beginning end of the coiled tubing so that air or other coolant may be drawn by the vacuum into the annulus or space 40 to provide the flow of cooling medium, i.e., air from the atmosphere, which is needed for maintaining the electrical logging cable sufficiently cool to prevent degradation thereof by excessive heat. The vacuum may also serve to remove any liquid coolant or liquid condensate from the annulus 40.

According to the present invention the method for manufacturing coiled tubing with electrical logging cable installed therein during the manufacturing process may be accomplished as follows. The manufacturing operation is initiated with a cable placement tube 36 being positioned such that an elongate, substantially straight portion thereof extends in the region of metal strip forming rolls or other strip forming apparatus and further extends past the welding station and through both sections of a heat treating furnace system and terminating sufficiently downstream of the furnace system that the heat of the stress relief furnace will not cause degradation of the logging cable emerging from the cable placement tube. The electrical logging cable is withdrawn from a storage reel containing logging cable of appropriate length and is passed through the packing gland 52 into the cable placement tube. The wireline cable is extended into the initial section of coiled tubing that has been welded and heat treated and the free or forward end of the logging cable is connected to the free end of the coiled tubing. The welding and heat treating operation is then continued while simultaneously cold air another inert gas is blown or otherwise passed through branch line 44 to a port in the cable placement tube located below the packing gland and around the logging cable. The welding process for the coiled tubing is continued by pulling or otherwise moving the metal strip material 12 through the roll forming dies, past the welding station and through the heat treating furnace system at a velocity that is appropriate for the formation of an efficient weld 30 at the seam that is formed by the opposed joined side edges of the metal strip material. As the coiled tubing being welded and heat treated is pulled or otherwise moved along through the manufacturing station, the electrical logging cable, being connected to the free or forward end of the coiled tubing will be pulled from its storage reel and continuously fed through the packing gland 52 through the cable placement tube 36. The manufacturing operation for the coiled tubing/logging cable assembly will be complete as the coiled tubing emerges from the heat treating system. The coiled tubing/logging cable assembly is then wound onto a storage reel 68 therefor until the storage reel is filled or a desired length of the coiled tubing/logging cable assembly has been wound thereon.

Although air or any other inert gas is preferable as the coolant being injected by pumping or suction into the cable placement tube, it should be born in mind that a liquid coolant or a combination of liquid and gas coolant constituents may be employed within the spirit and scope of the present invention. The coolant medium, whether liquid, gaseous or a combination of liquid and gas may be pumped through the cable placement tube 36 or may be drawn through the cable placement tube by means of vacuum or both pressure and vacuum may be employed to achieve adequate flow of appropriate coolant through the cable placement tube.

Thus, according to the present invention, coiled tubing is manufactured at an appropriate manufacturing site and simultaneously electrical logging cable is located within the coiled tubing. Thus the need for abandoned wells or sparsely traveled roadways for installation of logging cable inside coiled tubing is obviated by the present invention. The logging cable installation process is thus simplified and manual or mechanical handling and shipping of the logging cable, together with the consequent expense thereof is minimized.

In view of the foregoing, it is evident that the present invention is one well adapted to attain all of the objects and features hereinabove set forth, together with other objects and features which are inherent in the apparatus disclosed herein.

As will be readily apparent to those skilled in the art, the present invention may be produced in other specific forms without departing from its spirit or essential characteristics. The present embodiment, is therefore, to be considered as illustrative and not restrictive, the scope of the invention being indicated by the claims rather than the foregoing description, and all changes which come within the meaning and range of the equivalence of the claims are therefore intended to be embraced therein.

I claim:

1. A method for manufacturing a coiled tubing/electrical cable assembly at a manufacturing station incorporating roll forming dies for forming metal strip stock to tubular form, welding means for welding the seam of the formed tubing, heat treating means for stress relieving the welded tubing and a cable placement tube extending past the welding means, through the heat treating means and conducting electrical logging cable and coolant flow therethrough, said method comprising:
   (a) moving a strip of metal through said roll forming dies that position opposed edges of the metal strip in juxtaposition to form a longitudinal seam, during said forming, said metal strip being formed about said cable placement tube;
   (b) welding said longitudinal seam as said metal strip and said coiled tubing is moved linearly;
   (c) moving an electrical cable into said cable placement tube at substantially the same velocity of movement as the velocity of movement of said metal strip; and
   (d) passing a cooling medium through said cable placement tube and exhausting said coolant into said coiled tubing downstream of said heat treating means.

2. The method of claim 1, including:
   tensioning said electrical cable during movement thereof so as to properly compensate for shortening of said electrical cable during coiling thereof on a storage reel.

3. The method of claim 1 wherein said electrical cable is provided on a cable supply reel containing an unbroken length of electrical cable sufficient for the length of coiled tubing/electrical cable assembly to be manufactured and said strip of metal is provided on a strip supply reel containing an unbroken length of strip metal sufficient for the length of coiled tubing, electrical cable assembly to be manufactured, said method including:
 (a) withdrawing said strip of metal from said strip supply reel prior to moving said strip of metal through said roll forming dies; and
 (b) withdrawing said electrical cable from said cable supply reel and placing said electrical cable into registry with the internal passage of said coiled tubing being formed by said roll forming dies prior to positioning of said opposed edges of said metal strip in juxtaposition.

4. The method of claim 1, wherein:
 said welding being accomplished as said longitudinal seam is formed by said roll forming dies.

5. The method of claim 1, wherein:
 said cooling medium is a gas.

6. The method of claim 1, wherein:
 said cooling medium is a liquid.

7. The method of claim 6, wherein said cooling medium is a liquid and said method includes:
 withdrawing said liquid cooling medium from the internal passage of said coiled tubing/electrical cable assembly during said manufacture thereof.

8. The method of claim 1, including:
 applying a negative pressure to the completed end of said coiled tubing, electrical assembly to induce the flow of said cooling medium therethrough during said manufacture thereof.

9. Apparatus for manufacturing an elongate substantially non-jointed coiled tubing/electrical cable assembly, comprising:
 (a) means for supplying a substantially continuous strip of flat metal having opposed parallel edges;
 (b) die means for receiving said strip of flat metal and bringing opposed edges of said strip of flat metal into juxtaposition to define coiled tubing having a longitudinal seam;
 (c) welding means being positioned to form a weld at said longitudinal seam during substantially continuous movement of said coiled tubing in relation to said welding means;
 (d) heat treating means being located adjacent said welding means and receiving said coiled tubing after welding thereof said heat treating being of sufficient length to accomplish heat treating of said coiled tubing;
 (e) means of supplying a substantially continuous length of electrical cable;
 (f) a cable placement tube having an inlet end positioned to receive said electrical cable and a discharge end and having a substantially straight section of sufficient length to extend past said welding means through said heat treating means and to position said discharge end within said coiled tubing and at a location downstream of said heat treating means, said cable placement tube receiving electrical cable from said cable supplying and conducting said said electrical cable into said coiled tubing as said coiled tubing is welded and heat treated, said cable placement tube protecting said electrical cable from the heat of said welding and heat treating; and
 (g) means for passing a coolant fluid through said cable placement tube during said welding and heat treating to provide for cooling of said electrical cable.

10. The apparatus of claim 9, wherein:
 said cable placement tube is of a greater internal dimension than the outer dimension of said electrical cable so as to define an annular space about said electrical cable forming a flow passage for a coolant medium.

11. The apparatus of claim 9, wherein:
 said coolant fluid if a gas.

12. The apparatus of claim 9, wherein:
 said coolant fluid is a liquid.

13. The apparatus of claim 9, wherein:
 said coolant fluid is a mixture of a liquid and gas.

14. The apparatus of claim 9, wherein:
 said die means, welding means, heat treating means, and cable placement tube are each disposed in substantially fixed relation to one another.

15. The apparatus of claim 9, wherein said cable placement tube includes:
 (a) a cable inlet branch and a coolant inlet branch being disposed at said inlet end thereof;
 (b) a stuffing box being located at said cable inlet and receiving and forming a seal with said electrical cable; and
 (c) a coolant supply being in communication with said coolant branch and being operative to inject coolant medium into said cable placement under sufficient pressure to induce the flow of said coolant medium through said cable placement tube to said discharge end for protection of said electrical cable from heat induced deterioration.

16. The apparatus of claim 9, including:
 means forming a negative pressure within said coiled tubing to thus induce a cooling flow of air through said coiled tubing and said cable placement tube to protect said electrical cable from excessive heat during passage of said electrical cable past said welding means and through said heat treating means.

17. Apparatus for manufacturing an elongate substantially non-jointed coiled tubing/electrical cable assembly, comprising:
 (a) means for supplying a substantially continuous strip of flat metal having opposed parallel edges;
 (b) die means for receiving said strip of flat metal and bringing opposed edges of said strip of flat metal into juxtaposition to define coiled tubing having a longitudinal seam;
 (c) welding mans being positioned to form a weld at said longitudinal seam during substantially continuous movement of said coiled tubing in relation to said welding means;
 (d) heat treating means being located adjacent said welding means and receiving said coiled tubing after welding thereof said heat treating being of sufficient length to accomplish heat treating of said coiled tubing;
 (e) means of supplying a substantially continuous length of electrical cable;
 (f) a cable placement tube having an inlet end positioned to receive said electrical cable and a discharge end and having a substantially straight section of sufficient length to extend past said welding means through said heat treating means and to position said discharge end within said coiled tubing and at a location downstream of said heat treating means, said cable placement tube receiving electrical cable from said cable supplying and conducting said said electrical cable into said coiled tubing as said coiled tubing is welded and heat treated, said cable placement tube protecting said electrical cable from the heat of said welding and heat treating; and (g) means for injecting a coolant medium into said cable placement tube to thus induce the flow of said coolant medium from said inlet end to said discharge end to remove heat from within said cable placement tube and to discharge said coolant medium into said coiled tubing downstream of said heat treating means; and (h) a stuffing box being provided at said inlet end of said cable placement tubing, said electrical cable being moved through said stuffing box into said cable placement tube and being sealed by said stuffing box into said cable placement tube and being sealed by said stuffing box to prevent loss of said coolant medium at said inlet end of said cable placement tube.

* * * * *